United States Patent
Kates et al.

(10) Patent No.: US 8,903,356 B1
(45) Date of Patent: Dec. 2, 2014

(54) METHOD AND SYSTEM FOR SUGGESTING INDIVIDUAL PAYMENTS FOR A COMMON BILLING ACCOUNT

(75) Inventors: Jesse M. Kates, Kansas City, MO (US); Balaji S. Thenthiruperai, Overland Park, KS (US); Jeffrey A. Mau, Kansas City, MO (US); Narin Jaroensubphayanont, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2512 days.

(21) Appl. No.: 11/452,771

(22) Filed: Jun. 14, 2006

(51) Int. Cl.
 *H04M 11/00* (2006.01)
 *H04W 24/00* (2009.01)

(52) U.S. Cl.
 USPC ........................................ 455/406; 455/456.1

(58) Field of Classification Search
 USPC .......................................... 455/406, 518, 408
 See application file for complete search history.

(56) References Cited

U.S. PATENT DOCUMENTS

| | | | |
|---|---|---|---|
| 6,662,231 B1 | 12/2003 | Drosset et al. | |
| 6,925,160 B1 | 8/2005 | Stevens et al. | |
| 6,947,723 B1 | 9/2005 | Gurnani et al. | |
| 2002/0068546 A1* | 6/2002 | Plush et al. | 455/406 |
| 2004/0209595 A1 | 10/2004 | Bekanich | |
| 2004/0215536 A1 | 10/2004 | Deliwala et al. | |
| 2004/0259525 A1 | 12/2004 | Kotzin | |
| 2005/0043065 A1 | 2/2005 | Bekanich | |
| 2005/0053211 A1 | 3/2005 | Bevente et al. | |
| 2005/0055288 A1 | 3/2005 | Bevente et al. | |
| 2005/0055291 A1 | 3/2005 | Bevente et al. | |
| 2005/0191989 A1 | 9/2005 | Plush et al. | |
| 2005/0287982 A1 | 12/2005 | Brewer et al. | |
| 2006/0019630 A1 | 1/2006 | Sposato et al. | |
| 2006/0019632 A1 | 1/2006 | Cunningham et al. | |
| 2007/0111726 A1* | 5/2007 | Lambert et al. | 455/432.1 |

* cited by examiner

*Primary Examiner* — Michael Faragalla (57) ABSTRACT

In a shared communication service plan in which multiple subscribers operate under a common billing account, a method and system is provided for more equitably allocating service costs among the subscribers in the group, by allocating overage costs based on the extent to which each subscriber used base services available to the group. For instance, if the group plan includes a designated number of base minutes of service per month and defines a per-minute overage cost for minutes used beyond the base number, the method and system may allocate to a given subscriber a portion of the group's overage cost, with the portion being determined based on the portion of the group's base minutes used by the subscriber. Advantageously, an invoice may then be generated setting forth the equitable allocation among the subscribers in the group, thus allowing the group to more readily determine how much each subscriber should pay.

4 Claims, 6 Drawing Sheets

GROUP ACCOUNT DATA STORAGE ENTRY
FOR EXEMPLARY GROUP

| Subscriber | Suggested Use | Base Services | Overage Services |
|---|---|---|---|
| A | 500 | 700 | 0 |
| B | 500 | 550 | 0 |
| C | 500 | 250 | 150 |

METHOD AND SYSTEM FOR SUGGESTING INDIVIDUAL PAYMENTS FOR A COMMON BILLING ACCOUNT

FIELD OF THE INVENTION

The present invention relates to communication services and, more particularly, to invoicing of subscribers sharing a billing account for communication services.

BACKGROUND

Cellular wireless networks are becoming an increasingly popular form of communication. A user can connect to a cellular wireless network using a wireless device, such as a cellular phone. Once connected to the cellular wireless network, a user can communicate with another device also connected to the cellular wireless network. Additionally, the cellular wireless network can connect to the public switched telephone network, the Internet, or another network. Once connected to any of these networks, a wireless device can generally communicate with other devices on the network.

While connected to a cellular wireless network, a subscriber can access a variety of different services. For example, a user may be able to engage in a voice conversation, participate in an instant messaging session, browse websites, exchange files with other devices, download content to the wireless device or engage in many other now-known or later-created services. A subscriber ordinarily agrees to communication services by signing a service contact. The subscriber is then billed in accordance with the terms of the service contract.

Providers of wireless communication services generally bill subscribers for their access to the cellular wireless network periodically (e.g. on a monthly basis, for example). Providers commonly offer a flat rate for a monthly package of communication services. A basic package, or service plan, may include a predefined quantity of a particular type of service or services. For example, a typical service plan might include an allotment of minutes for wireless voice communications. When a subscriber uses communication services not included in their package, the subscriber may incur additional charges, often referred to as "overage" costs. For example, a provider may charge additional fees for minutes used in excess of a subscriber's allocation, long-distance calls, "roaming" outside of the subscriber's home area, or for other such charges.

Currently, providers of wireless communication services offer service plans that can be shared by multiple subscribers. When subscribers share a plan, fees accrued by the subscribers are charged to a shared billing account. Therefore, service providers usually generate a single invoice for all subscribers sharing the account. Consumers find shared plans desirable, as shared accounts often reduce a subscriber's expenses. Service providers also benefit from shared plans as such plans attract new subscribers, expanding their customer base. In particular, subscribers are attracted to shared accounts because of the ease with which shared accounts can be created. Subscribers are also attracted by the ease of joining existing accounts, created by friends and family. Herein, an account shared by multiple subscribers may be referred to as a "shared account," "common billing account," "shared service plan," or by other similar terms. Individual subscribers that as a group, share a common billing account, may be referred to as each having a "subscription." Therefore, a single common billing account may include multiple subscriptions.

While there are many advantages to shared billing accounts, room for improvement exists. In particular, existing billing or invoicing systems may generate invoices that are somewhat confusing to subscribers. Invoices for shared plans are billed similarly to a single subscriber plan, listing all charges to the account. Shared invoices do not readily differentiate costs for which individual subscribers in a group are responsible. As such, current bills for shared plans do not provide easy-to-access information facilitating an equitable division of costs among subscribers. A group who shares an account may wish to split their fees amongst themselves, so the lack of simple invoicing, suggesting a fair amount to be paid by each subscriber, may be frustrating to the group.

SUMMARY

Suggesting an equitable share of fees for a group of subscribers sharing a plan can be difficult. An individual subscriber's use of services may seem incongruent with the fees attributable to their use. For example, one subscriber may use all or a majority of the minutes included in a given billing period before a second subscriber uses any of the shared minutes. If the second subscriber subsequently uses minutes during the same billing period, their communications may incur "overage" fees, as their use exceeds the account's allotment of minutes. Overage charges are often more costly than the minutes included in the base service plan. Thus, even though the second customer may use less minutes, they may pay considerably more for their use for no other reason than the timing of their use. This result may seem unfair to many subscribers. Thus, a billing method and system that suggests an equitable allocation of costs for a shared billing account is desirable.

Accordingly, disclosed herein is a billing method for communication services. The method may be applied in a system where communication services are provided to a group of subscribers who share a billing account, and where the group is billed a first cost for a base quantity of communication services shared by the group and a second cost for usage of communication services in excess of the base quantity. According to the method, a suggested cost is established respectively for each subscriber, by (i) allocating a share of the first cost to the subscriber, (ii) determining a portion of the base quantity used by the subscriber, (iii) based, at least in part, on the portion of the base quantity used by the subscriber, allocating a share of the second cost to the subscriber, and (iv) mathematically combining at least the allocated share of the first cost and the allocated share of the second cost to establish the suggested cost for the subscriber. The method then involves generating one or more invoices for the billing account shared by the group, the invoice(s) indicating, for each subscriber in the group, the suggested cost for the subscriber.

In this or other methods, the base quantity of communication services may comprise an allotment of minutes shared by the group of subscribers, and the first cost may comprise a fixed recurring (e.g., monthly) cost. Further, the communication services in excess of the base quantity may comprise overage minutes, and the second cost may comprise a variable cost determined at least in part by the number of overage minutes used by the group.

The method may further comprise maintaining a group usage record that indicates, for a predefined time period, a cumulative usage level of communication services for the group. The act of determining the portion of the base quantity used by a given subscriber may then comprise determining a quantity of communication services used by the subscriber when the cumulative usage level is less than the base quantity.

Additionally, the method may comprise maintaining, for each subscriber in the group, an individual usage record that indicates usage of communication services by the subscriber. To maintain this record in practice, whenever a communication service is provided to the subscriber, a corresponding service record for the communication service may be created, including an identifier of the subscriber. Further, the service record may include an identifier of the group to which the subscriber belongs, and the service record may indicate a time when the service occurred and may further indicate, or be updated to indicate, whether or not the cumulative usage level exceeded the base quantity at the time the service occurred.

In the exemplary method, the act of allocating a share of the first cost to a given subscriber may involve (i) determining a total number of subscribers in the group, (ii) determining a share of the first cost, at least in part, by dividing the first cost by the total number of subscribers in the group, and (iii) allocating the share of the first cost to the subscriber.

Further, the act of allocating a share of the second cost to the subscriber based at least in part on the portion of the base quantity used by the subscriber may involve (i) mathematically comparing at least the portion of the base quantity used by the subscriber and the cumulative usage level, and (ii) using the mathematical comparison as a basis for allocating a share of the second cost to the subscriber. In this regard, mathematically comparing at least the portion of the base quantity used by the subscriber and the cumulative usage level may involve determining a ratio of the portion of the base quantity used by the subscriber to the cumulative usage level. Further, using the mathematical comparison at a basis for allocating a share of the second cost to the subscriber may involve multiplying the second cost by the determined ratio.

In another respect, the act of allocating a share of the second cost to the subscriber based at least in part on the portion of the base quantity used by the subscriber may involve (i) determining a total quantity of communication services used by the subscriber by summing the portion of the base quantity used by the subscriber and a quantity of the communication services used by the subscriber in excess of the base quantity, (ii) calculating a ratio of the total quantity as compared the cumulative usage level by the group, (iii) determining a share of the second cost at least in part by multiplying the ratio by the second cost, and (iv) allocating the share of the second cost to the subscriber.

In still another respect, in a scenario where the base quantity of communication services comprises a base quantity of minutes shared among the subscribers and the communication services in excess of the base quantity are quantified as overage minutes, the act of allocating a share of the second cost to each subscriber based at least in part on the portion of the base quantity used by the subscriber may involve (i) defining a suggested quantity of minutes for use by the subscriber, (ii) determining a portion of the base quantity of minutes used by the subscriber, (iii) mathematically comparing the suggested quantity of minutes to the portion of the base quantity used by the subscriber, and (iv) using the mathematical comparison as a basis for allocating a share of the second cost to the subscriber.

Also disclosed herein is another billing method for communication services. The method may be applied in a scenario where the communication services are provided to a group of subscribers who share a billing account, where the communication services are quantified by minutes of communication service used by the group, and wherein the group is billed a first cost for a base quantity of minutes and a second cost for overage minutes, i.e., minutes in excess of the base quantity. The method may involve (a) allocating an equal share of the first cost to each subscriber in the group, (b) determining a total quantity of minutes used by the group, (c) establishing a suggested cost respectively for each subscriber in the group, and (d) generating at least one invoice for the shared billing account, the invoice(s) indicating, respectively for each subscriber in the group, the suggested cost established for the subscriber.

In this or other methods, the act of establishing the suggested cost respectively for each subscriber in the group may involve (i) determining a portion of the base quantity used by the subscriber and a quantity of overage minutes used by the subscriber, (ii) calculating a total quantity of minutes used by the subscriber by summing the portion of the base quantity used by the subscriber and the quantity of overage minutes used by the subscriber, (iii) based at least in part on the total quantity of minutes used by the subscriber, allocating a share of the second cost to the subscriber; and (iv) mathematically combining at least the equal share of the first cost and the allocated share of the second cost to establish a suggested cost for the subscriber.

Additionally disclosed herein is a billing system for communication services. The system may operate in a scenario where communication services are provided to a group of subscribers who share a billing account, and where the group is billed a first cost for a base quantity of communication services shared by the group and second cost for group usage of communication services in excess of the base quantity. The system may include (a) data storage, (b) record keeping program logic stored in the data storage, (c) cost allocation program logic stored in the data storage, and (d) invoice generation logic stored in the data storage.

In this or other systems, the record keeping program logic may be executable to maintain a usage record that comprises, for each subscriber, a record of each communication service provided to the subscriber. The cost allocation program logic may be executable, for each subscriber, to (i) allocate a share of the first cost to the subscriber, (ii) access the data storage and determine, from the usage record, a portion of the base quantity used by the subscriber, (iii) allocate a share of the second cost to the subscriber based at least in part on the portion of the base quantity used by the subscriber, and (iv) mathematically combine the allocated share of the first cost and the allocated share of the second cost to establish a suggested cost for the subscriber. Further, the invoice generation program logic may be executable to generate for the shared billing account at least one invoice indicating, for each subscriber in the group, the suggested cost established for the subscriber.

Still further, this or other systems may include billing cycle data stored in the data storage. In an exemplary embodiment, the billing cycle data may define a schedule for periodically executing both the cost allocation program logic and the invoice generation program logic.

These and other aspects, advantages, and alternatives will become more apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, elimi-

DETAILED DESCRIPTION

Figure 1:
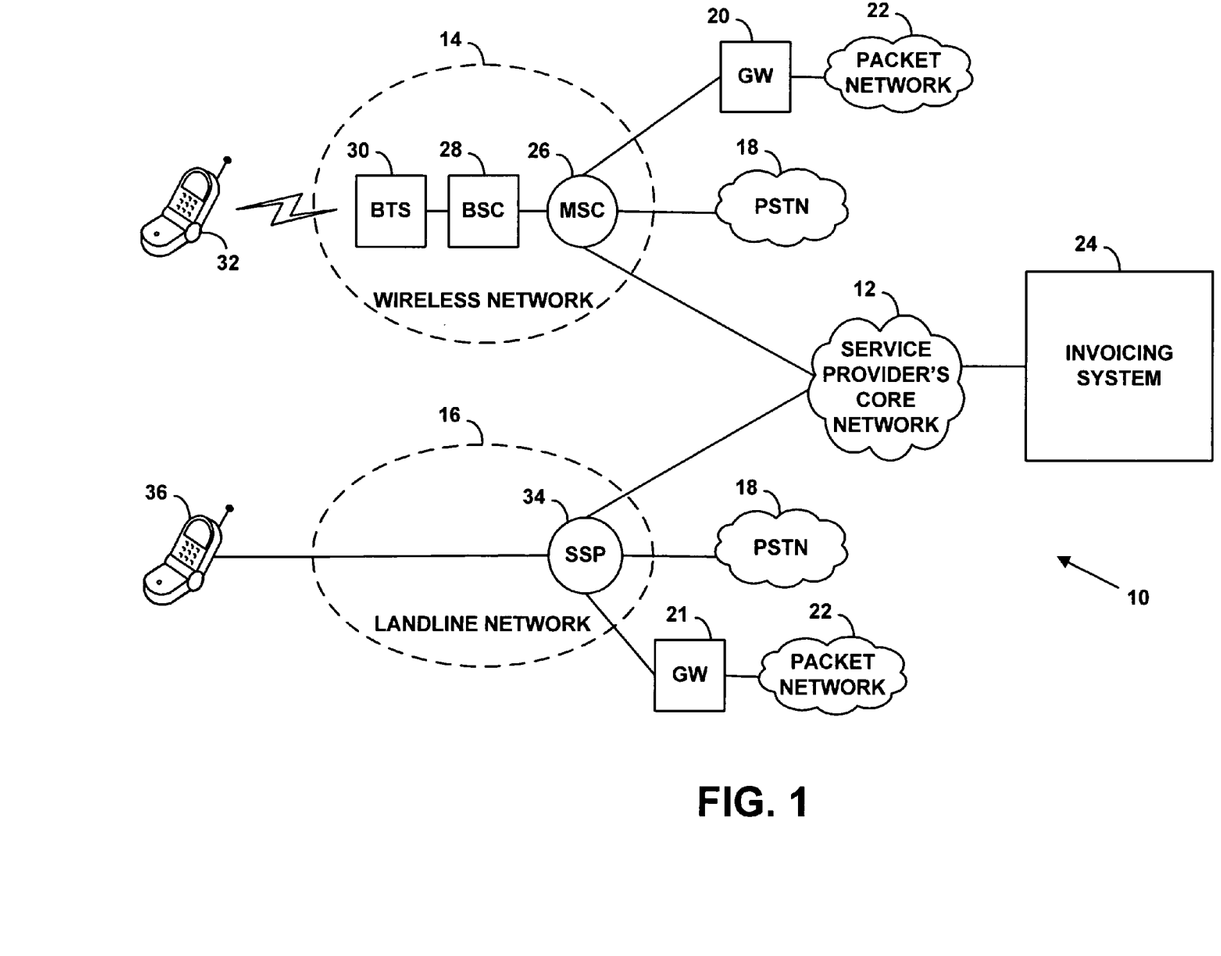
FIG. 1 is a simplified block diagram of a network in which an exemplary embodiment of the invention can be implemented.

Example network 10 of FIG. 1 includes a service provider's core network 12, such as an ATM and/or IP-based network. Connected with the core network 12 is then one or more access networks/systems, such as a wireless access network 14 and a landline access network 16, each of which may allow subscribers to engage in telecommunication services such as voice telephony and data communications. Each of the access networks is coupled, in turn, with one or more transport networks, such as the public switched telephone network (PSTN) 18 and (through a packet gateway 20, 21) a packet-switched network 22 (such as the Internet, or the carrier's core network 12). Further, also connected with the core network 12 is a invoicing system 24, which preferably carries out a billing method suggesting equitable allocation of costs for a shared service plan.

Each of the access networks shown by way of example in FIG. 1 includes a switch (or other analogous entity) that functions to connect calls or other communications between subscriber stations and transport networks. For instance, the wireless access network 14 includes a mobile switching center (MSC) 26, which, together with a base station controller (BSC) 28 and base transceiver station (BTS) 30, provides connectivity between one or more wireless subscriber stations (e.g., wireless communication device (WCD) 32) and one or more transport networks. The landline access network 16 includes a service switching point (SSP) 34, which provides connectivity between one or more landline subscriber stations (e.g., landline telephone device 36) and one or more transport networks.

Wireless access network 14 may, more specifically, take the form of a cellular radio access network. Typically in such a network, one or more BTSs 30 would radiate to define one or more wireless coverage areas, such as cells and cell sectors, in which WCDs can operate. One or more BSCs 32 would then control air interface communications between the BTSs and the WCDs, such as to assign air interface traffic channels and facilitate handoff of communications between wireless coverage areas. In turn, one or more MSCs would control one or more BSCs and provide connectivity with one or more transport networks. Such a network could employ various types of air interface protocols, such as AMPS, TDMA, CDMA, GSM, 802.11, or other protocols now known or later developed.

Although FIG. 1 depicts in wireless access network 14 a single MSC, a single BSC and a single BTS, it should be understood that more than one of each might exist. Further, in some implementations, these components could be integrated together in various combinations. For instance, often the functions of the BSC and MSC are integrated into a single platform, which may or may not be co-located or integrated with a BTS. Still further, note that wireless access network 14 could take various other forms as well.

Landline access network 16, on the other hand, may take the form of a conventional telephone network. Such a network may include one or more local exchange carrier (LEC) switches. In a usual arrangement, a given LEC switch will reside at a LEC's central office (or at an equivalent location, such as a cable service provider's point of presence) and will serve a particular region of landline telephone subscribers, each coupled to the LEC switch by a local loop telephone line (e.g., twisted pair, fiber, coaxial cable, through one or more intermediate entities, such as digital concentrators, cable head-ends, etc.). SSP 34 shown in FIG. 1 could be a LEC switch or some other sort of switch or other entity that provides connectivity for landline subscriber stations. Further, landline access network 16 could take other forms as well.

In practice, a switch such as MSC 26 or SSP 34 may receive requests to set up calls to or from various subscriber stations and may responsively set up those calls, or cause the calls to be set up. For example, in the wireless access network 14, MSC 26 may receive an origination message transmitted from WCD 32 (via BTS 30 and BTS 28), seeking to initiate a call to a particular telephone number. In response, if the MSC 26 does not itself serve the called number, MSC 26 may engage in call setup signaling (such as ISUP signaling) through a signaling network (e.g., the carrier's core network 12, or another network) in an effort to set up the call. Alternatively, if the MSC 26 itself serves the number, then the MSC 26 may direct BSC 28 to ring the called device, and BSC 28 may do so. Once a communication path is ready between the MSC 26 and the called party, the MSC 26 may then connect the call through to the called party; and allow the call to proceed.

As another example, MSC 26 may receive a request from WCD 32 to establish data connectivity such as a wireless web session. In response, MSC 26 may engage in signaling with gateway 20, 21 to establish a packet network connectivity for the WCD 32 and may allow the WCD 32 to commence data communications.

As still another example, MSC 26 may receive a request from a signaling network seeking to set up a call to WCD 32. In response, MSC 26 may direct BSC 28 to ring WCD 32. BSC 28 may then send a page and alert message (via BTS 30) over an air interface control channel to WCD 32. When WCD 32 answers the call, MSC 26 may then allow the call to proceed.

Similarly, in the landline access network 16, SSP 34 may receive a request from landline telephone device 36 to initiate a call to a particular number. For instance, landline telephone device 36 may apply dialed digits to the local loop telephone line, which SSP 34 may receive directly or through one or more other entities. In response, if the SSP 34 does not serve the called number, SSP 34 may engage in call setup signaling (such as ISUP signaling) through a signaling network (e.g., the carrier's core network 12, or another network) in an effort to set up the call. Alternatively, if SSP 34 serves the called number, SSP 34 may itself ring that called line. Once a communication path is ready between the SSP 34 and the called party, the SSP 34 may then connect the call through to the called party, and allow the call to proceed.

And yet as another example, SSP 34 may receive a request from a signaling network seeking to set up a call to landline telephone device 36. In response, SSP 34 or another entity may apply a ring signal on the local loop telephone line to device 36, to cause device 36 to ring. When device 36 answers the call, SSP 34 may then allow the call to proceed.

Although not shown in FIG. 1, note that other switches may be present in the telecommunication network 10 as well. For instance, an inter-exchange carrier (IXC) may provide a switch that serves a connection between LEC switches, MSCs or other regional telecommunication systems, so as to facilitate long distance and other inter-switch calling. As another example, private switches (e.g., PBX servers) might be provided to serve enterprises or other groups of subscribers (e.g., hotels, campuses, etc.) Other examples are possible as well.

Conventionally, a switch (such as an MSC, an LEC switch, an IXC switch, or a PBX server, for instance) will also track subscriber usage, to facilitate billing and performance monitoring. To do so, for each call that the switch handles, the switch will generate a Call Detail Record (CDR). The CDR may take various forms but often includes certain information about the call, such as the originating number, terminating number, start time, stop time, and call type (e.g., landline, wireless-wireless, long distance, voice, data (e.g., if routed to gateway 20, 21), etc.) Each CDR may be formatted as a database record with predefined fields.

A switch may be programmed to record call duration in each CDR with a desired level of accuracy. For instance, a switch could be programmed to record call duration in minutes and seconds (and even fractions of seconds). And as another example, a switch could be programmed to round call duration to the nearest whole minute and to record that whole minute count in the CDR. Further, a switch may be programmed to record a special call duration for particular calls. For instance, a switch could be programmed to record a duration of zero for calls placed between two of the carrier's subscribers (e.g., mobile-to-mobile calls), for calls placed to the carrier's customer service center or to other special destinations, or for calls that experienced system disconnects. Other examples are possible as well.

Periodically, or in response to a triggering event (such as generation of each CDR, or receipt of a request from the invoicing system 24), a switch may programmatically send to the invoicing system 24 the CDRs that it has generated. Based on the CDRs, subscriber service plans, and perhaps other data, the invoicing system 24 may compute and apply charges to subscriber accounts, such as shared billing accounts. On a recurring basis, such as every month, every other month, or quarterly, for instance, the invoicing system 24 may generate subscriber invoices and send the invoices to subscribers or groups of subscribers for payment.

Figure 2:
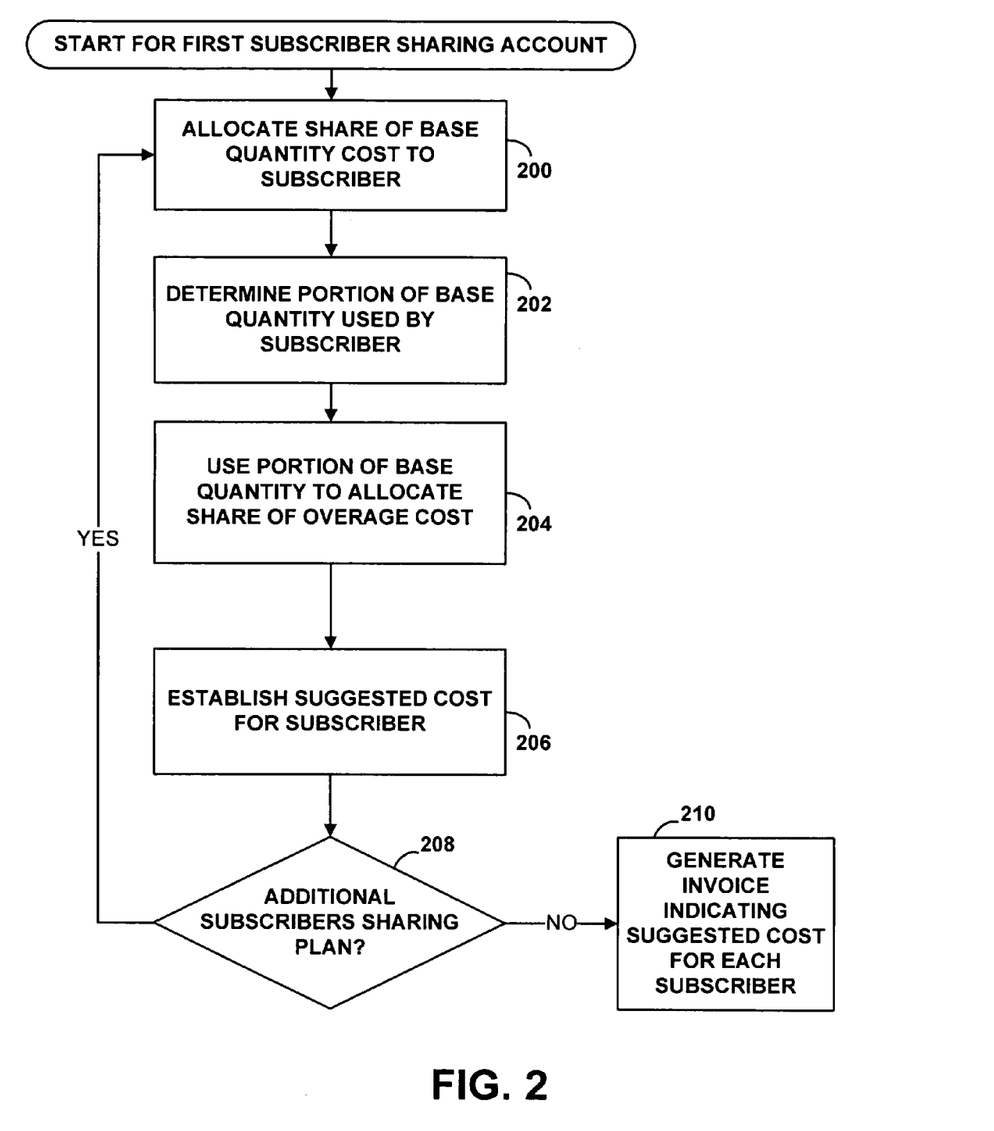
FIG. 2 is a flow chart depicting functions that can be carried out in accordance with an exemplary embodiment.

FIG. 2 depicts an exemplary billing method for communication services, wherein the communication services are provided to a group of subscribers who share a common billing account. In the depicted embodiment, the group may pay a first cost (also referred to herein as a "base cost") for a base quantity of communication services (also referred to herein as "base communication services" or "base services") each billing period. For example a group may pay a monthly fee for a package including an allotment of service minutes for voice communications. The group may also pay a second cost (also referred to herein in as an "overage cost") for use of communication services in excess of the base quantity (also referred to herein as "overage services"), during the billing period. For example, the subscribers may be charged on a per-minute basis for airtime minutes used after the group exhausts their base services. The exemplary method establishes a suggested cost for each subscriber in the group, by allocating a share of the base cost, and a share of overage costs, to each subscriber. An invoice is then generated which indicates the suggested cost for each subscriber in the group. Provided with suggested costs, the group can conveniently divide costs amongst themselves in an equitable manner.

More specifically, to establish a suggested cost for a subscriber, a share of the cost for the base quantity is first allocated to the subscriber, as shown in step 200. Next, in step 202, the portion of the base quantity used by the subscriber is determined. Then, in step 204, the portion of the base quantity used by the subscriber is used to allocate a share of the overage cost (or costs). A suggested cost for the subscriber can then be established by totaling the allocated share of the base cost and the allocated share of overage costs, as shown in step 206. If there are additional subscribers in the group, the process of establishing a suggested cost may be repeated for each subscriber in the group, as shown in step 208. Once a suggested cost has been established for each subscriber in the group, an invoice is generated for the group's common billing account, as shown in step 210. Preferably the invoice will indicate the suggested cost for each subscriber.

It is important to note that the share of the base cost allocated to the subscriber might not be related to the base communication services used by the subscriber. Preferably, the cost of the base quantity of communication services will be divided equally among the subscribers in the group. Thus, the share of the first cost may be determined by dividing the cost for the base plan by the number of subscribers in the group. For example, if a group of two subscribers pays $80.00 for 1000 base minutes each month, each subscriber might be allocated $40.00 of the charge for the base minutes. In an alternative embodiment, the base cost allocated to a subscriber might depend on the portion of base services used by the subscriber. For example, a subscriber using 40% of the minutes included in a group's package could be allocated 40% of the base cost. Other examples are possible as well.

An equal allocation of base costs may appeal to a group's sense of fairness, as they may assume that group members will make use of communication services more or less evenly. Further, groups may find an equal allocation of base costs fair because a shared service plan typically includes a certain quantity of minutes, which if they go unused, expire at the end of a payment period. Thus, it may be the group's expectation, referring to the above example, that each of the two subscribers use approximately 500 minutes each month. However, while it may be the group's expectation that services will be evenly used, nothing prevents subscribers from using base services unevenly.

In particular, during a given billing period, service providers may reduce the quantity of base services available for use as services are used, without regard to which subscriber in the group uses the services. As services are usually distributed in this "first-come first-served" manner, one subscriber may use more base services than other subscribers in their group. This system is beneficial to subscribers as it allows them flexibility in their use. However, it also makes deriving an equitable division of shared costs difficult.

As an example, a first subscriber sharing a 1000 minute plan may use 700 minutes in the same time frame a second subscriber sharing the plan uses 300 minutes. Therefore, the base quantity available to the group may be exhausted when the first subscriber has used 700 base minutes and the second subscriber has used 300 base minutes, resulting in overage charges for any further use of services. As a result, if the second subscriber goes on to use 200 more minutes during the billing period (for a total of 500 minutes during the billing period), the second subscriber may incur expensive overage charges for 200 minutes of their use. The service provider may charge $0.30 per overage minute. Thus, in this particular billing period, the second subscriber would incur $60.00 of overage charges. Simply assigning the overage costs to the subscriber who incurred them, in this case the second subscriber who used less minutes during the billing period, may be considered unfair. To suggest a more equitable distribution of overage costs, the exemplary method considers a subscriber's use of base services to suggest an allocation of charges.

Specifically, to calculate an equitable suggested cost, a share of overage costs may be allocated to a subscriber based, at least in part, on the subscriber's use of the base services included in their shared plan. Thus, a subscriber using more than an equitable share of a group's base minutes may be allocated a greater share of overage costs, regardless of whether or not the subscriber incurred overage costs. When subscribers pay an equal share for the base plan, such division of overage costs is more equitable, as a subscriber using more base services is paying the same portion of the base cost as a subscriber using less of the base minutes.

Figure 3A:
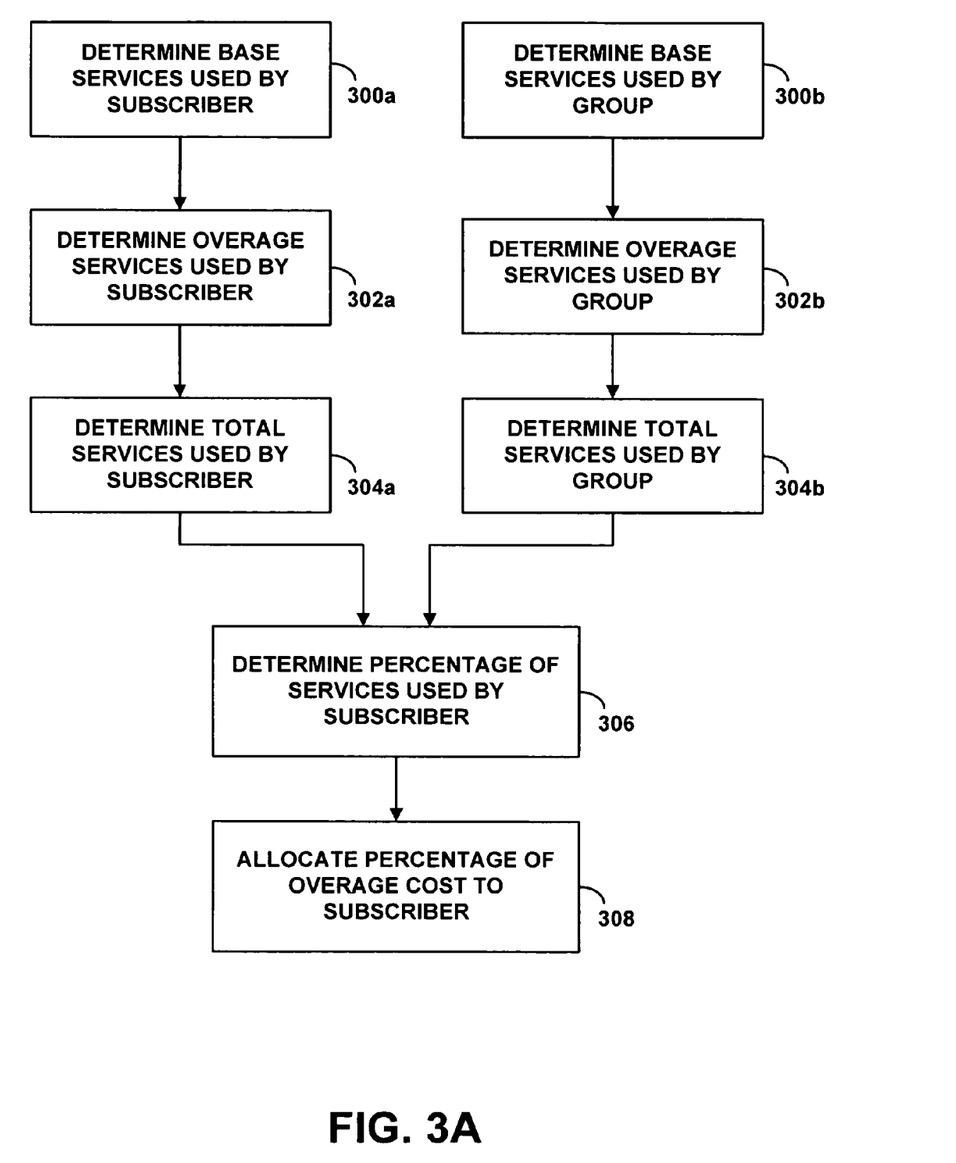
FIG. 3A is another flow chart depicting functions that can be carried out in accordance with an exemplary embodiment.

FIG. 3A shows an exemplary subroutine for allocating overage costs to subscribers who share a common billing account. Rather than assigning overage costs directly to the subscriber who used the corresponding overage minutes, the subroutine considers, at a minimum, a subscriber's use of base services. More specifically, the subroutine calculates the percentage of a group's cumulative usage for which a subscriber is responsible, and then allocates a similar percentage of the overage costs to the subscriber.

To calculate an individual subscriber's use, as compared to use by their group, the quantity of base communication services used by both the subscriber and the group as a whole may be determined, as shown in step 300a and step 300b respectively. In addition, the quantity of overage communication services used by both the subscriber and the group may be determined, as shown in step 302a and step 302b respectively. The total quantity of minutes used by both the subscriber and the group can then be calculated by totaling the quantity of base communication services and the quantity of overage communication services for both, as shown in step 304a and step 304b respectively. The percentage of minutes used by the subscriber can then be calculated by dividing the total quantity of services used by the subscriber by the total quantity of services used by the group, as shown in step 306. Then, in step 308, a share of the overage costs can be allocated to the subscriber by multiplying the percentage of minutes used by the subscriber by the overage costs.

For example, a first subscriber using 700 minutes of a 1000 minute plan, where a second subscriber in the group subsequently uses 500 minutes, might be allocated 58% of overage costs. This allocated percentage corresponds to the percentage of all minutes, including base minutes and overage minutes, used by the first subscriber. Other examples are possible as well. As an alternative to the allocation subroutine depicted by FIG. 3A, the first subscriber above might be allocated 70% of overage costs, corresponding to the percentage of base minutes used by the first subscriber. Other examples are possible as well.

The equitable distribution of costs associated with a shared account may be mathematically represented as well. As an example, the following formula may be used:

Suggested Cost=(*BC*/*S*)+(*SS*/*GS*)\**OC*+*MC*

In this formula, BC is the cost for a base quantity of communication services for the group, S is the number of subscribers sharing the plan, SS is the total quantity of services used by the subscriber (including base and overage services), GS is the total quantity of services used by the group, OC is total cost for overage services, and MC is any miscellaneous costs. Miscellaneous costs may include any subscriber-specific costs, as well as other costs. Further, the group costs BC and OC may include any taxes associated with those costs, as well as other costs.

As another alternative, overage costs may be allocated in such a manner as to simulate individual accounts for each subscriber in a group. Many subscribers may create shared accounts rather than individual accounts to save money. However, for practical purposes, subscribers sharing a service plan may view their services as the equivalent of a number of individual service plans. For example, three subscribers sharing a package including 1200 minutes may view their package as equivalent to having three individual service plans, each plan including 400 base minutes. Thus, a group sharing a service plan may view an allocation of costs that simulates individual accounts as equitable.

Figure 3B:
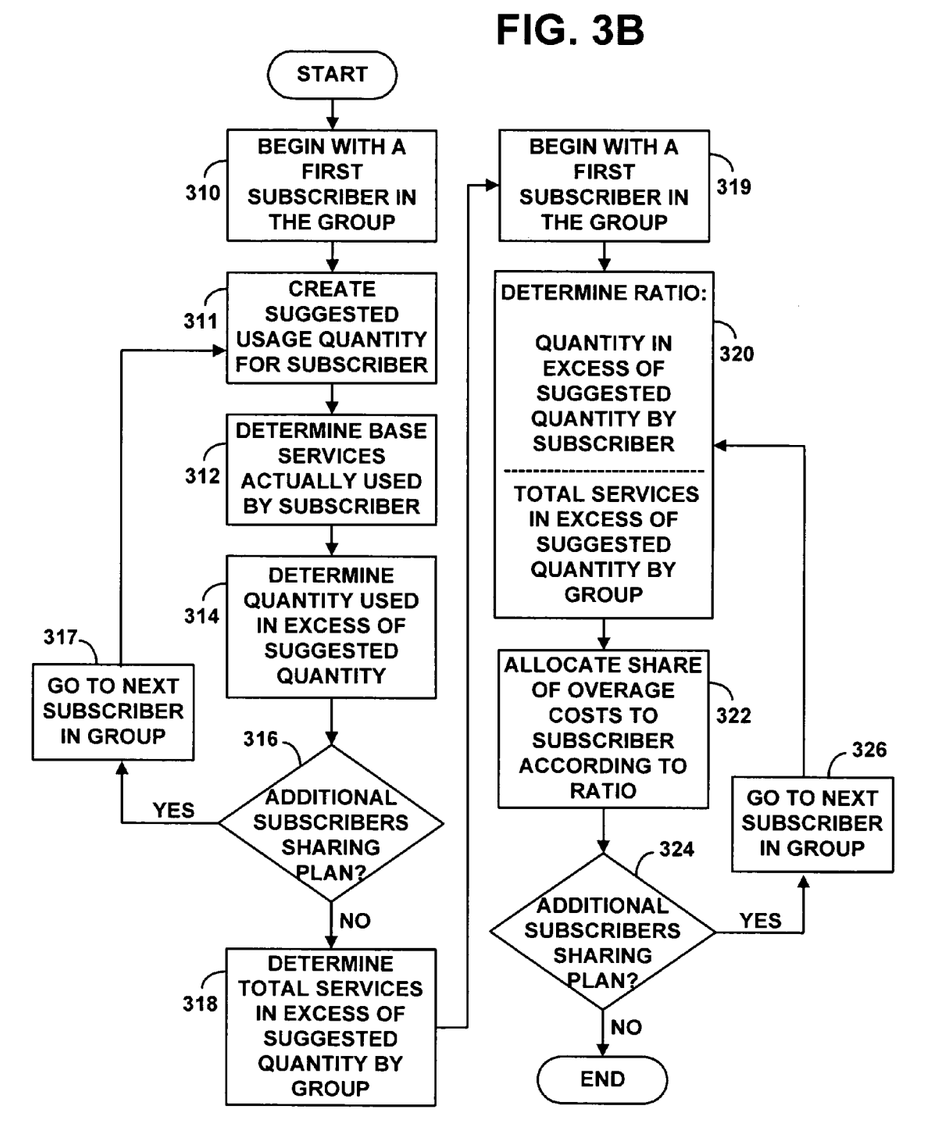
FIG. 3B is another flow chart depicting functions that can be carried out in accordance with an exemplary embodiment.

FIG. 3B depicts a subroutine for allocating overage charges so as to simulate individual plans for subscribers to a shared account. As a general matter, the subroutine involves (i) cycling through the subscribers in the group to determine for each subscriber a quantity of base communication services used by the subscriber in excess of a suggested usage for the subscriber, (ii) determining a sum total of the subscribers' usage in excess of their suggested usage, and (iii) cycling through the subscribers in the group to allocate shares of the overage cost to each subscriber based on a comparison of their excess usage to the total excess usage for the group.

More particularly, at step 310, the subroutine begins with a first subscriber in the group. At step 311, for that subscriber, the subroutine creates a suggested quantity of base communication services. Preferably, when base costs are distributed equally, the suggested quantity of base communication services will be the same for all subscribers in a group. Next, at step 312, the subroutine determines the portion of the base quantity actually used by the subscriber. At step 314, the subroutine then subtracts the suggested quantity from the portion of the base quantity actually used by the subscriber, resulting in a measure of usage in excess of the suggested quantity. At steps 316 and 317, the subroutine then determines if a next subscriber exists in the group and, if so, the subroutine repeats this analysis with respect to the next subscriber.

Suggesting a quantity of base minutes for each subscriber may simulate individual accounts for the subscribers, each simulated account including the suggested quantity of base minutes. Thus, calculating use of base services in excess of the suggested quantity may simulate overage services for the simulated plans.

Once the simulated overage minutes have been calculated for each subscriber in the group, the subroutine may allocate a share of the overage costs to each subscriber. First, as shown by step 318, the subroutine determines a total quantity of simulated overage services used by the group (i.e. the sum of all subscribers' quantities in excess of the suggested quantity). At step 319, the subroutine then begins with a first subscriber in the group. At step 320, for that subscriber, the subroutine calculates a ratio of (i) the subscriber's simulated overage services to (ii) the group's total simulated overage services. The subroutine then uses this ratio as a basis' to allocate a share of the actual overage costs to the subscriber, such as by multiplying the ratio by the overage costs, at step 322. The process of allocating a share of overage costs may then be repeated for each subscriber in the group, as shown in step 324. At steps 324 and 326, the subroutine then determines if a next subscriber exists in the group and, if so, the subroutine repeats this analysis with respect to the next subscriber.

In an exemplary allocation derived using the method of FIG. 3B, three subscribers may share a 1500 minute service plan. During a first part of a billing period a first subscriber may use 700 minutes, a second subscriber may use 550 minutes, and a third subscriber may use 100 minutes. Thus, in the first part of the billing period, the group has used 1350 minutes, leaving 150 base minutes available for use in the remainder of the billing period. The third subscriber may then use another 300 minutes in a second part of the billing period. As a result, the group as a whole has now used 1650 minutes. Since 150 minutes of the third subscriber's use occurred after the base quantity of services had been exhausted, this use incurs overage charges. Note that the timing of the third subscriber's use has resulted in overage charges, despite the fact the third subscriber only used 400 minutes during the billing period, as compared to 700 minutes by the first subscriber, and 550 minutes by the second subscriber.

To equitably allocate the incurred overage charges, a quantity of 500 base minutes for each subscriber may be suggested. In the scenario where base costs are split equally among the group, it follows that an equal quantity of base minutes, in this case 500 base minutes, may be suggested for each subscriber. Thus, the first and second subscriber have exceeded the suggested quantity by 200 base minutes and 50 base minutes, respectively, while the third subscriber has not used any minutes in excess of the suggested quantity. As a result, the total quantity of simulated overage minutes is 250. Note that as the third subscriber used less than the suggested quantity, only 150 overage minutes were actually used by the group. If the service provider charges $0.30 per minute for overage minutes, the total overage charge for the group is $45.00. Therefore, the first subscriber will be responsible for 80%, or $36.00, of the overage charge. This result is reached by dividing first subscriber's simulated overage, 200 minutes, by the group's total simulated overage, 250 minutes. In addition, the second subscriber is responsible for 20%, or $9.00, of the group's overage charge. The third subscriber, as logically follows from using less than a third of the group's base minutes, is not responsible for any overage charges.

Figure 4:
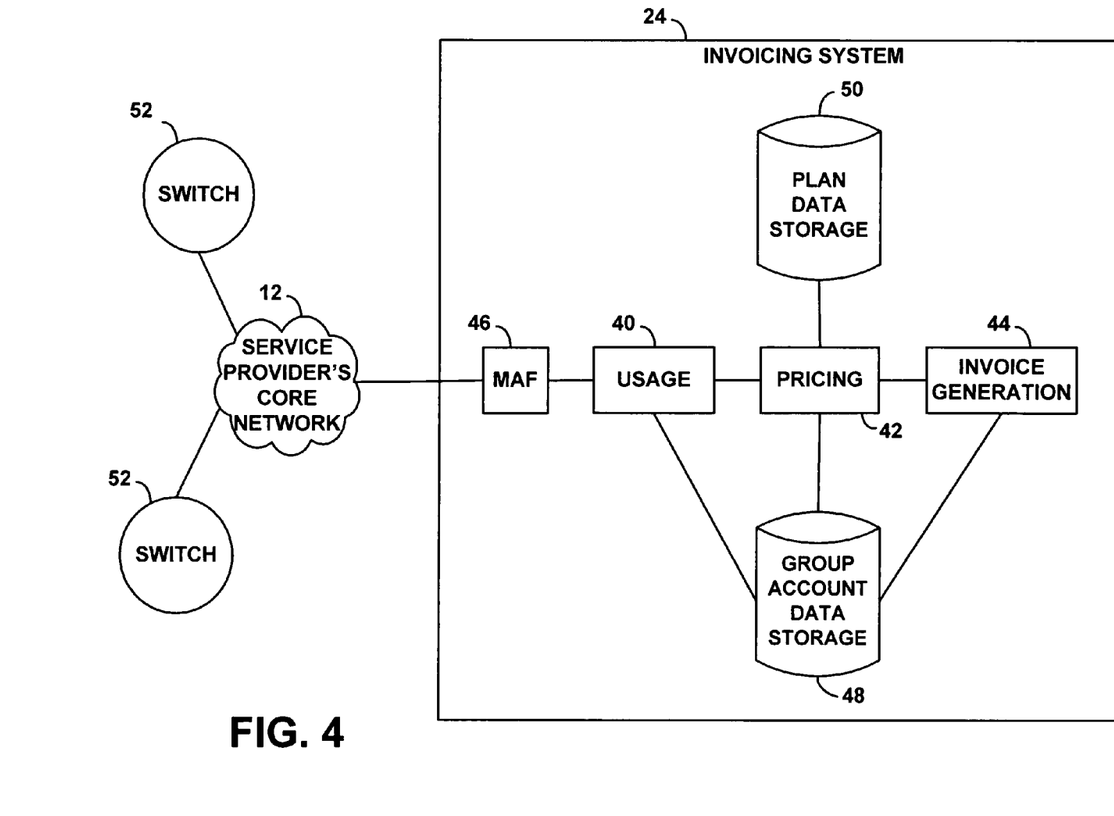
FIG. 4 is a simplified network block diagram depicting components of an invoicing system in accordance with an exemplary embodiment.

FIG. 4 depicts components of an invoicing system for communication services, wherein the communication services are provided to a group of subscribers who share a billing account. The exemplary invoicing system can take various forms. In a preferred embodiment, for instance, the invoicing system 24 may comprise a number of subsystems, each of which could take the form of one or more programmed computers (e.g., computers with microprocessors and data storage (e.g., one or more volatile or non-volatile storage media, in one or more computers or other devices), and with machine language instructions (program logic) stored in the data storage and executable by the microprocessors), and all of which could reside on a local area network or could be connected together in some other way. As shown by way of example in FIG. 4, the subsystems may include a usage subsystem 40, a pricing subsystem 42, and a invoice generation subsystem 44. Further, the invoicing system 24 may include a Message Acquisition and Formatter (MAF) 46 (e.g., a computer server) to buffer CDRs entering the invoicing system, and a subscriber account store 48 to hold subscriber accounts, such as records of usage and service plan and payment information. In addition, the billing system may be operable to receive, via the service provider's core network, CDRs from various switches 52.

The plan data storage 50 may store, for each shared account, the subscribers that share the account. Therefore, if necessary, usage subsystem 40 may query subscriber group database 50 to determine if the calling subscriber uses a shared service plan, and if so, to which shared account the subscriber belongs. In addition, plan data storage 50 may store details of a group's service plan such as the base quantity of communication services shared by the group, the cost of the base quantity, cost for use in excess of the base quantity or overage charges, as well as other information. Further, while FIG. 4 shows plan data storage 50 and group account data storage 48 as separate entities, these data stores may be combined a single data storage unit. Other configurations are possible as well.

The MAF 46 may be operable to receive CDRs as they arrive at the invoicing system 24 from one or more switches 52 or other entities. The MAF 46 may operate to queue the CDRs as they are received, so as to facilitate accurate record keeping for all communication services. Alternatively, MAF 46 and usage subsystem 40 may be combined as a single subsystem, operable to receive, queue, and format CDRs. While only two switches 52 are depicted, the MAF could receive CDRs from any number of switches. Further, switches sending CDRs may take a number of forms, such as MSCs or SSPs, as well as others. Additionally, MAF 46 may function to send CDRs to the usage subsystem 40 for formatting.

The usage subsystem 40, upon receipt of a CDR, may reformat the CDR into a format used by the billing system 44, as well as other formats. For example, usage subsystem 40 may omit any unnecessary information. In addition, usage subsystem 40 may use a CDR to calculate a quantity of usage for the particular communication (e.g. the length, in minutes, of a particular call). The usage subsystem may then record the quantity of use in the appropriate shared account record in the group account data storage 48. For example, when usage subsystem 40 receives a CDR for a call placed by a shared plan subscriber, the usage subsystem may insert into the group's account, a record including the length of the call. In addition, the inserted record may include an identifier of the subscriber placing the call and/or an identifier of the group, as well as other information.

Given a CDR, the usage subsystem 40 may be arranged to calculate minutes of use (MOU) in various ways, possibly depending on the type of information provided in the CDR and upon one or more other factors. For instance, the usage subsystem 40 may simply read or compute an actual call duration (including minutes and seconds) from a CDR (i.e., extract a call duration from the CDR) and treat that call duration as the MOU. As another example, the usage subsystem 40 may round call duration up or down to the nearest whole minute, and treat the rounded number of minutes as the MOU for the call (effectively treating any partial minute as a whole minute). And as yet another example, usage subsystem 40 could apply special MOU-calculation rules for particular types of calls or particular subscribers, such as (i) concluding that any call between two subscribers in a group sharing a billing account has zero MOU, (ii) concluding that any call between two subscribers in the carrier's network (e.g., mobile-to-mobile calls) had zero MOU, (iii) concluding that any call to the carrier's customer service center or to other special destinations had zero MOU, or (iv) adjusting the MOU for a given call due to a service level of the caller, or for promotional purposes or other reasons. Other examples are possible as well.

As usage subsystem 40 records the MOU for a given call into the appropriate record in group account data store 48, the usage subsystem 40 may also update a record of the total number of minutes used for that account during the current billing period (e.g., month, quarter, etc.). Thus, account data store 48 can provide an up-to-date quantity of communication services used by a group at a given point during a billing period. In an alternative embodiment, the usage subsystem 40 may simply record in the group account an indication of MOU together with a description of the call (e.g., called number, time of call, etc.).

Usage subsystem 40 may also include other data when creating a record for a call. For example, usage system 40 may indicate whether the MOU for a particular call should be debited from the base services available for a group's use. On the other hand, usage subsystem 40 may indicate that a group has used all their base services at the time the call occurred. To do so, usage system 40 may query the group account data store 48 for the total quantity of minutes used up to the time of the call in the current billing period, and also may query plan data storage 50 to retrieve the quantity of base services included in the group's shared service plan. If the total quantity of minutes used by the group is greater than or equal to quantity of base services included in the group's plan, this may indicate the record is for an overage service, and appropriate charges can be made when invoicing. In addition, to identify which subscriber in a group placed a call or used a particular communication service, usage subsystem 40 may record the subscriber's cellular number, a subscriber-ID, and/or another identifier associating a record of a service with the subscriber using the service.

Figure 5:
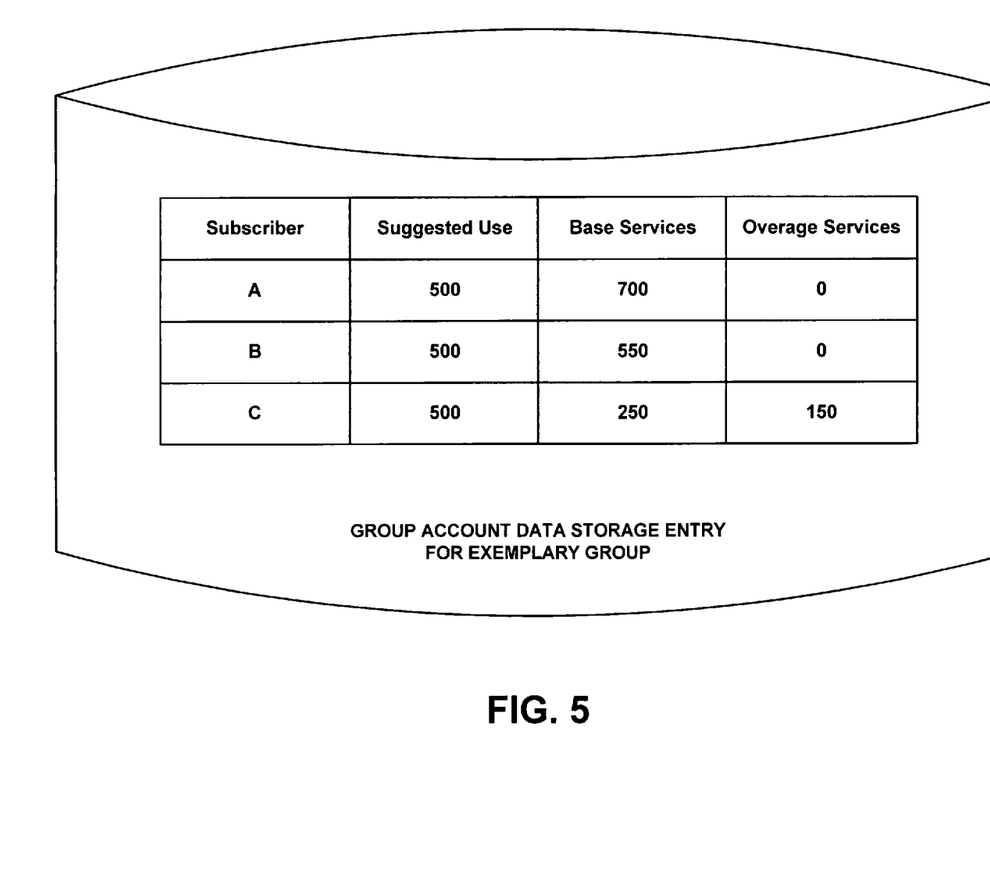
FIG. 5 is depiction of usage data stored for a group sharing an account.

FIG. 5 shows exemplary data stored for a group sharing an account after the group account data store has been populated. In this example, the data shown is for the earlier described group of three subscribers sharing a service plan including 1500 minutes. After the invoicing system has handled the CDRs for the services used by the group, the group account data store may contain the illustrated data, including, for each subscriber, a suggested quantity of base services for use by the subscriber, the actually quantity of base services used by the subscriber, and overage services used by the subscriber.

Pricing subsystem 42 may operate, at the end of a billing period or at another designated time, to apply a billing process to determine a charge or charges for the services provided to a group of subscribers during the billing period. For a given shared account, the invoice generation subsystem may calculate charges separately for different types of communication services, such as for voice calls, text messaging, file downloads, data transfer, or other services summing the charges for each type of service to reach the total cost to the group. Alternatively, pricing subsystem 42 could perform this function for all types of services, thus producing a cumulative charge to the account.

For a given type of communication service (e.g. voice or text), pricing subsystem 42 may calculate total charges by separately summing the charges for base services and overage services, as well as other charges. Additionally, pricing subsystem 42 may total charges for base and overage services, as well as other charges, for multiple types of communication services. Generally, the cost for base services will be fixed, although other possibilities, such as banded billing, are possible as well.

When a fixed fee is charged for base services, pricing subsystem 42 can simply query plan data store 50 to retrieve the fixed cost for the group's service plan. Along with the cost for base services, pricing subsystem 42 may be able to retrieve a cost for taxes associated with the group's usage, as well as other costs for which the group as a whole is responsible. In the exemplary system, pricing subsystem 42 can query group account data store 48 and retrieve records of overage services provided to a group, including MOU for the overage services. In addition, pricing subsystem 42 can retrieve the cost structure for overage services from plan data store 50. In the exemplary system, the overage cost may be a cost per MOU. With the records of overage services used by the group, and the groups overage cost structure, the pricing subsystem 42 can calculate an overage cost for the group.

Pricing subsystem 42 may further function to create a suggested cost for each subscriber. To do so, pricing subsystem 42 may query group account data store 48 for a record of a group's use of base services, as well as a group's use of overage services. Specifically, a record for each call or service during a billing period may be retrieved. Each retrieved record may provide an indication of whether or not the group had used all base services at the time a particular service was used (e.g. whether the MOU or other measure of use was debited from the base quantity of services or, on the other hand, the service should be classified as an overage service). Further, each record may indicate which subscriber in the group used the particular service. In addition, pricing subsystem may query plan data storage 50 to retrieve pricing information for the group's service plan. The pricing information may include a cost for base services. For example, the shared plan may provide the group an allotment of minutes for voice calls, and possibly a quantity of text messages and/or a quantity of data transfer, as well other services. In this scenario, the pricing subsystem might retrieve the fixed cost, as well as the quantity or quantities of the various services provided to the group.

Provided with records of usage by a group, as well as pricing information for the group, pricing subsystem 42 may execute program logic for establishing a suggested cost for each subscriber in the group. The suggested cost or costs can be calculated according to methods described herein, or by other methods. Once pricing subsystem 42 has calculated suggested costs, the suggested costs can be sent to invoice generation subsystem 44 for use in invoicing.

Invoice generation subsystem 44 may function to generate one or many different types of invoices or bills. In particular, an invoice may take the form of a paper bill, which can be sent to one or all subscribers in a group via mail service. In addition or alternatively, a group's invoice may be available for viewing electronically via the Internet or another source. As such, subscribers may be able to view, and possibly pay, their bill on their phone, computer workstation, or any other device accessing the network. In addition, an electronic invoice can conveniently be printed out by subscribers in the group. As yet another alternative or additional form of invoicing, an auditory invoice may be provided, giving a group access to their bill via telephone, either by using an automated telephone system or by speaking with live customer support (or by using a combination of an automated system and live support). Other types of invoices may also be created.

Invoice generation subsystem 44 may generate an invoice indicating the suggested cost for each subscriber in a group in a user-friendly manner. For example, an invoice designed for viewing by subscribers (e.g. a paper or online bill), may include the suggested cost, respectively, for each subscriber at the top of the first page (if the invoice comprises multiple pages), or in another location where the user can readily view the suggested costs. In the case of an auditory invoice, the subscriber may be provided with an option to immediately, or soon after connecting, hear their suggested cost, and potentially the suggested costs for the other subscribers with whom the inquiring subscriber shares a plan.

Invoices generated by billing system 44 may also conveniently indicate the total charge to the group. Further, the invoice may also provide a breakdown of the total charge, indicating total charges for base services and for overage services. In addition, a breakdown of the total charge by the different types of service, as well as base and overage costs on a per service basis may be included. And yet further, a breakdown of each subscriber's suggested cost into base and overage costs may be included. And in addition, the invoice may indicate taxes on the account, as well as other various charges, which also may be further separated into base and overage charges. To facilitate a better understanding of charges, all such information may be included in the same readily accessible area as the suggested costs, or elsewhere.

In an alternative embodiment, invoice generation subsystem 44 may generate a different invoice for each subscriber in a group sharing a billing account. Such an invoice might indicate the suggested cost only for the subscriber receiving the bill or viewing the bill online, for example. In addition, invoicing system 24 may provide an option for each subscriber in a group to be separately billed for the suggested cost. If a group has opted to be separately invoiced, the invoice may include only the suggested cost for the subscriber receiving the invoice. In addition, an individual invoice might include the total charge to the group, as well as other information enhancing the subscriber's understanding of their invoice.

One skilled in the art should understand that many alternative configurations of the system are possible. For example, the various subsystems (MAF 46, usage subsystem 40, pricing subsystem 42 and invoice generation subsystem 44) may be combined in various manners. All these subsystems could be combined in a single subsystem, or combined in other configurations.

Although this discussion of a billing method and system has often refers to voice calls, measured in minutes, as the type of communications service used by the group, it should be understood that the extent of use could be measured in other manners and for other types of communication service. For instance, subscriber use of minutes could be measured in (i) seconds or other fractions of minutes, (ii) groups of minutes, (iii) hours, or (iv) other time increments. Additionally, communication services the system could invoice for include: (i) text messaging usage quantified by a number of text messages used, (ii) wireless pack-data services quantified by the size transferred data, and (iii) pay-per-download services quantified by a number of downloads, as well as others.

An exemplary embodiment of the invention has been described herein. Those skilled in the art will understand, however, that changes and modifications may be made to the embodiment described without departing from the true scope and spirit of the invention, which is defined by the claims.

We claim:

1. A billing method for communication services, wherein the communication services are provided to a group of subscribers who share a billing account, and wherein the group is billed a first cost for a base quantity of communication services shared by the group and a second cost for total usage of communication services in excess of the base quantity by the group, the method comprising:
   (a) for each subscriber in the group:
   (i) allocating a share of the first cost to the subscriber;
   (ii) determining a portion of the base quantity used by the subscriber;
   (iii) based at least in part on the portion of the base quantity used by the subscriber, allocating a share of the second cost to the subscriber; and
   (iv) mathematically combining at least the allocated share of the first cost and the allocated share of the second cost to establish a suggested cost for the subscriber; and
   (b) generating at least one invoice for the billing account shared by the group, the at least one invoice indicating, for each subscriber in the group, the suggested cost for the subscriber, wherein allocating a share of the first cost to the subscriber comprises: determining a total number of subscribers in the group;
   determining a share of the first cost, at least in part, by dividing the first cost by the total number of subscribers in the group; and allocating the share of the first cost to the subscriber, wherein allocating a share of the second cost to the subscriber, based, at least in part, on the portion of the base quantity used by the subscriber, comprises:
   mathematically comparing at least the portion of the base quantity used by the subscriber and the cumulative usage level; and using the mathematical comparison as a basis for allocating a share of the second cost to the subscriber, wherein mathematically comparing at least the portion of the base quantity used by the subscriber and the cumulative usage level, comprises determining a ratio of (i) the portion of the base quantity used by the subscriber to (ii) the cumulative usage level.

2. The method of claim 1, wherein using the mathematical comparison as a basis for allocating a share of the second cost to the subscriber comprises multiplying the second cost by the determined ratio.

3. A billing method for communication services, wherein the communication services are provided to a group of subscribers who share a billing account, and wherein the group is billed a first cost for a base quantity of communication services shared by the group and a second cost for total usage of communication services in excess of the base quantity by the group, the method comprising:
   (a) for each subscriber in the group:
   (i) allocating a share of the first cost to the subscriber;
   (ii) determining a portion of the base quantity used by the subscriber;
   (iii) based at least in part on the portion of the base quantity used by the subscriber, allocating a share of the second cost to the subscriber; and
   (iv) mathematically combining at least the allocated share of the first cost and the allocated share of the second cost to establish a suggested cost for the subscriber; and
   (b) generating at least one invoice for the billing account shared by the group, the at least one invoice indicating, for each subscriber in the group, the suggested cost for the subscriber, wherein allocating a share of the second cost to the subscriber based, at least in part, on the portion of the base quantity used by the subscriber comprises: determining a total quantity of communication services used by the subscriber by summing the portion of the base quantity used by the subscriber and a quantity of the communication services used by the subscriber in excess of the base quantity; calculating a ratio of the total quantity as compared the to a cumulative usage level by the group; and determining a share of the second cost at least in part by multiplying the ratio by the second cost; and allocating the share of the second cost to the subscriber.

4. A billing method for a communication services, wherein the communication services are provided to a group of subscribers who share a billing account, wherein the communication services are quantified by minutes of communication service used by the group, and wherein the group is billed a first cost for a base quantity of minutes and a second cost for total overage minutes used by the group, wherein the overage minutes comprise minutes in excess of the base quantity, the method comprising:
- (a) allocating a share of the first cost to each subscriber in the group;
- (b) determining a total quantity of minutes used by the group;
- (c) for each subscriber in the group:
    - (i) determining a portion of the base quantity used by the subscriber and a quantity of overage minutes used by the subscriber;
    - (ii) calculating a total quantity of minutes used by the subscriber by summing the portion of the base quantity used by the subscriber and the quantity of overage minutes used by the subscriber;
    - (iii) based at least in part on the total quantity of minutes used by the subscriber, allocating a share of the second cost to the subscriber; and
    - (iv) mathematically combining at least the equal share of the first cost and the allocated share of the second cost to establish a suggested cost for the subscriber; and
- (d) generating an invoice for the shared billing account, the invoice indicating, for each subscriber in the group, the suggested cost established for the subscriber.

* * * * *